US007007387B2

(12) United States Patent
Kuzuu

(10) Patent No.: US 7,007,387 B2
(45) Date of Patent: Mar. 7, 2006

(54) NAIL CLIPPER FOR PETS WITH CURVED BLADE PIECES

(75) Inventor: Masayuki Kuzuu, Tochigi (JP)

(73) Assignee: Yuko Kuzuu, Tochigi (JP)

( * ) Notice: Subject to any disclaimer, the term of this patent is extended or adjusted under 35 U.S.C. 154(b) by 77 days.

(21) Appl. No.: 10/733,549

(22) Filed: Dec. 10, 2003

(65) Prior Publication Data

US 2004/0117988 A1 Jun. 24, 2004

(30) Foreign Application Priority Data

Dec. 19, 2002 (JP) .............................. 2002-383428

(51) Int. Cl.
*A45D 29/02* (2006.01)
(52) U.S. Cl. ............................................ 30/28; 30/192
(58) Field of Classification Search ............... 30/28, 30/192, 191, 193, 199, 26, 27, 29; 132/73.5, 132/75.5, 75.4
See application file for complete search history.

(56) References Cited

U.S. PATENT DOCUMENTS

| 475,940 | A | * | 5/1892 | Hamlin | 433/1 |
|---|---|---|---|---|---|
| 756,056 | A | * | 3/1904 | Roraback | 12/104.5 |
| 813,598 | A | * | 2/1906 | Sylvester | 30/178 |
| 967,598 | A | * | 8/1910 | Bader | 132/75.5 |
| 1,300,330 | A | * | 4/1919 | Bernard | 30/179 |
| 1,841,847 | A | * | 1/1932 | Peters | 30/28 |
| 5,701,672 | A | * | 12/1997 | Wachtel et al. | 30/28 |
| 6,473,969 | B1 | * | 11/2002 | Rinaldi | 30/28 |
| 6,523,545 | B1 | * | 2/2003 | Rende | 132/75.5 |
| 6,944,953 | B1 | * | 9/2005 | Momosaki | |

FOREIGN PATENT DOCUMENTS

DE  221436  * 4/1908

* cited by examiner

*Primary Examiner*—Kenneth E. Peterson
(74) *Attorney, Agent, or Firm*—Leighton K. Chong; Godbey Griffiths Reiss & Chong

(57) ABSTRACT

A nail clipper for pets has a scissors structure provided with cutting surfaces formed by curved blade pieces. The curved blade pieces are created by dividing a spherical or elliptical body into quarter pieces having a hollow interior and formed with curved cutting edges. The blade pieces are hinged to opposite ends of a holding piece and moved by pivoting parts coupled to the ends of operating parts of the scissors structure. By operating the scissors structure, the curved blade pieces open and come together to cut the pet's nail, producing smooth nail edges cut in a curved shape with a single cutting action.

9 Claims, 2 Drawing Sheets

FIG. 3A
FIG. 3B
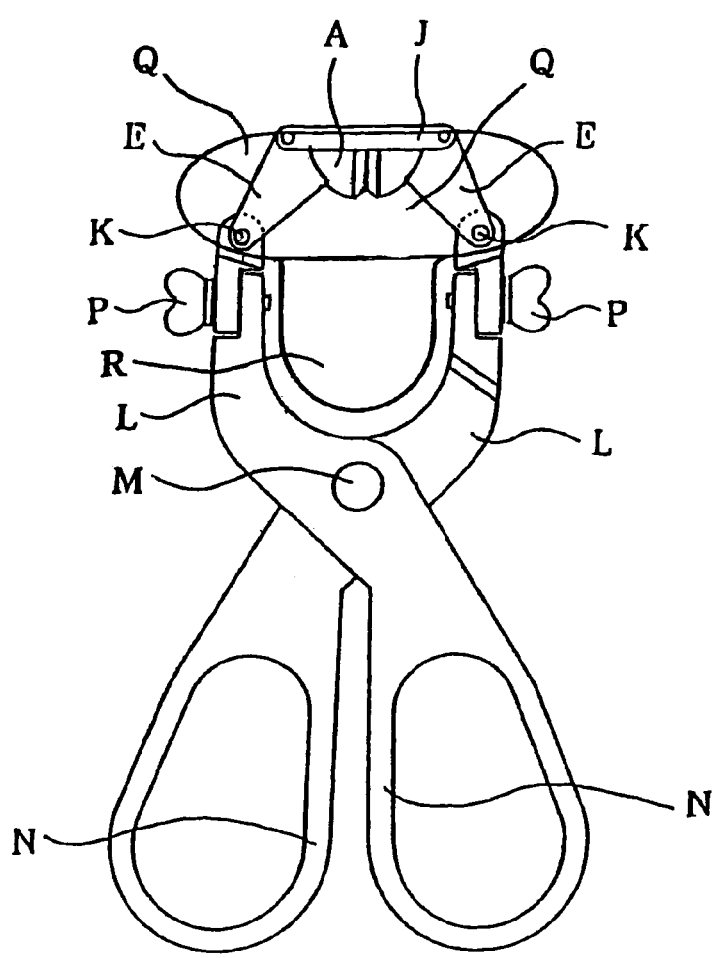
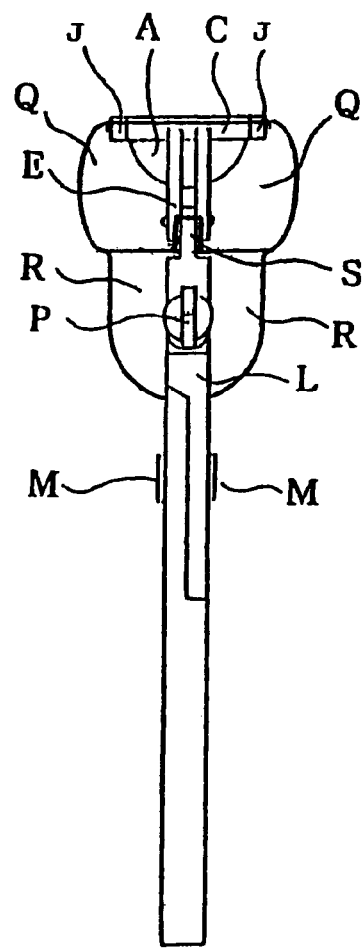

NAIL CLIPPER FOR PETS WITH CURVED BLADE PIECES

TECHNICAL FIELD

This invention generally relates to a nail clipper for pets, and particularly, to one having a scissors structure provided with cutting surfaces formed by curved blade pieces.

BACKGROUND OF INVENTION

The conventional nail clipper for pets, such as dogs and cats, typically has a straight or slightly curved cutting edge. This presents a problem in that the nail when cut may have a sharp edge.

SUMMARY OF INVENTION

In accordance with the present invention, a nail clipper for pets has a scissors structure provided with cutting surfaces formed by curved blade pieces. The curved blade pieces are created such as by dividing a spherical body with a straight line into two equal pieces, and further dividing each semi-spherical piece with a straight line into two equal quarter-spherical pieces, with each of the pieces having a hollow interior and formed with a curved cutting edge. Alternatively, the blade pieces may be formed by dividing an elliptical body into equal quarter-elliptical pieces. Each curved blade piece is pivotably mounted to face and abut with each other along their cutting edges. The blade pieces are hinged by hinge parts to opposite ends of a holding piece and adapted to be pivotably moved by pivoting parts coupled to respective operating parts of the scissors structure. By operating the scissors handles, the blade pieces are able to open and close together so as to cut the nail of a pet placed between the blade pieces.

In a preferred embodiment, each blade piece is attached to a hinge mounting board on an opposite side from the blade cutting edge. One edge of the board mounts a cylinder-shaped hinge provided with a pin hole. Two blade pieces are arranged with their cutting edges facing and touching one another. A pin is inserted through a hole on the end of a holding piece and into each hinge pin hole to connect the blade pieces to the holding piece. Pivoting parts are attached to the respective blade pieces, in order to to open and retract the blade pieces about their axes of rotation. The ends of the pivoting parts are coupled to the ends of two operating parts (arms) of the scissors structure. The two operating parts are coupled across one another at a pivot center, and secured by a rotation pin together. The other ends of the operating parts have scissors handles or grips. By opening and closing the grips, the nail cutter is able to cut the nail of a pet placed between the cutting edges of the blade pieces. The operating parts also have angle adjustment mechanisms at their operating ends to allow for preferential angle setting of the blades relative to the ends of the operating parts. A collecting box may also be attached around the blade pieces for containing and preventing the dispersion of cut pieces of nail. The box may be split into two parts with each part having attachments to connect the two pieces in order to allow for easy detachment of the box from the whole unit.

Other objects, features, and advantages of the present invention will be explained in the following detailed description of the invention having reference to the appended drawings.

BRIEF DESCRIPTION OF DRAWINGS

FIG. 3A is a side elevation view and FIG. 3B is a side edge view of another embodiment of the scissors structure of the nail clipper for pets having a collection box for cut nails.

DETAILED DESCRIPTION OF INVENTION

Figure 1A:
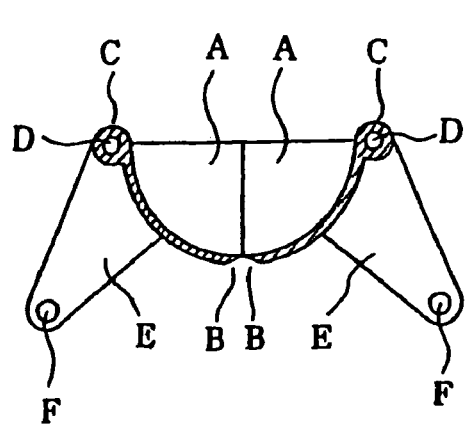
FIG. 1A is a side sectional view and FIG. 1B is an overhead view of the arrangement of curved blade pieces in a preferred embodiment of a nail clipper for pets in accordance with the present invention.
Figure 1B:
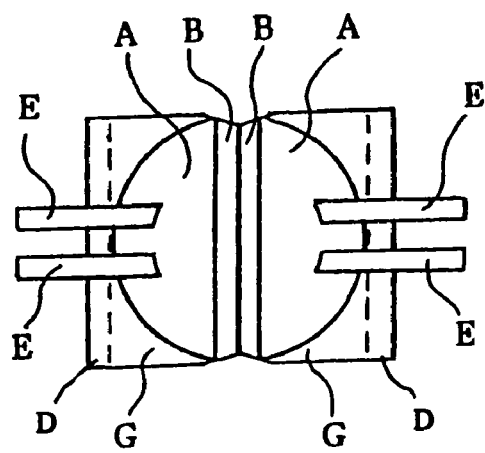

Referring to FIG. 1A and FIG. 1B, a nail clipper for pets in accordance with the present invention is provided with cutting surfaces formed by curved blade pieces A. The curved blade pieces A are created such as by dividing a spherical body with a straight line into two equal pieces, and further dividing each semi-spherical piece with a straight line into two equal quarter-spherical pieces, with each of the pieces having a hollow interior and formed with a complementary curved cutting edge B. Alternatively, the blade pieces may be formed by dividing an elliptical body into equal quarter-elliptical pieces. Each curved blade piece A is pivotably mounted to face and abut with each other along their cutting edges B. The blade pieces A are attached to cylinder-shaped, metal hinge parts C with pin holes D on the sides of the blade pieces A opposite from the cutting edges B. Pivoting parts E are attached (preferably in parallel pairs on each side for stability) to the respective blade pieces for pivoting them about the axes of rotation of the hinge parts C. Holes F are provided in the pivoting parts E for coupling to the operating parts of a scissors structure (described below). The hinge part C may be formed along one edge of a hinge mounting board G, made of material such as metal, which is attached to the rim of the blade piece A. With this construction, the curved blade pieces A can open and come together to cut the pet's nail, producing smooth nail edges cut in a curved shape with a single cutting action.

Figure 2A:
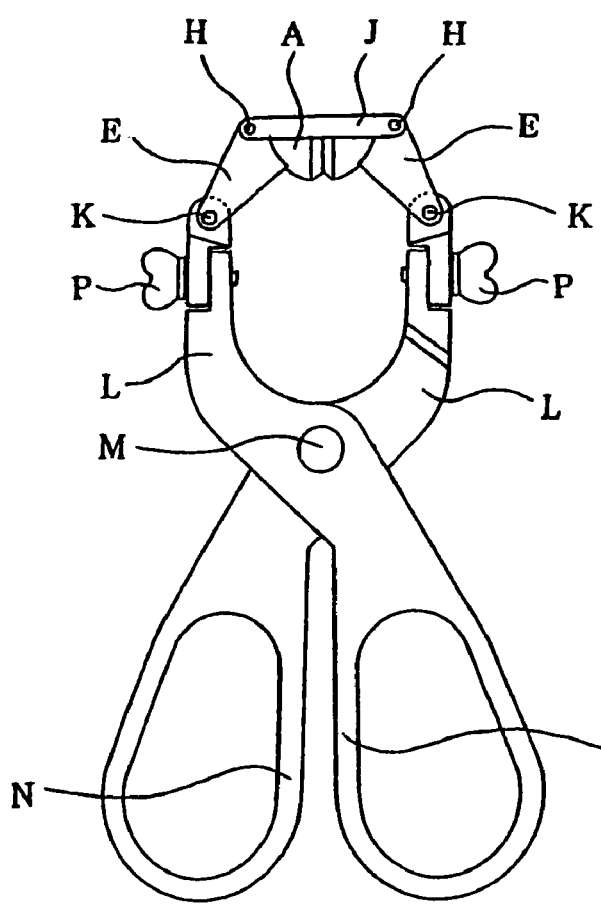
FIG. 2A is a side elevation view and FIG. 2B is a side edge view of the overall scissors structure of a preferred embodiment of a nail clipper for pets.
Figure 2B:
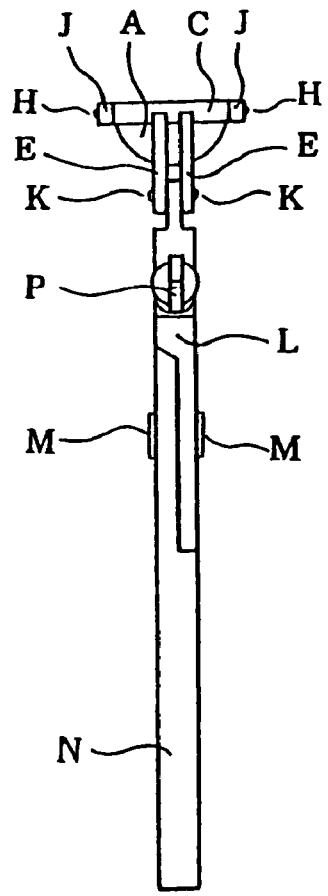

Referring to FIG. 2A and FIG. 2B, a scissor structure is provided for pivotably moving the blade pieces open and closed so as to cut the nail of a pet placed between the blade pieces. Two blade pieces A (left and right) are mounted with their cutting edges B facing and touching one another by inserting a pin H, made of material such as metal, through a holding piece J and into each pin holes D of the hinge part C attached to a respective blade piece A. By pivoting the pivoting parts E, the blade pieces A are thus able to open and retract with the pins H as the center of rotation. The pivoting parts E are coupled to operating parts (arms) L at opposite positions, right and left, by inserting pins K into pin holes formed at the ends of the operating parts L, which is made of material such as metal. The two operating parts L cross one another at a pivot center and are secured together by a rotation pin M, made of material such as metal. Handles or grips N are provided on the opposite ends of the operating parts L for actuating the opening and closing movements. As a further feature, the operating parts are formed with an angle adjustment mechanism at their operating ends. The ends are cut to allow them to be swiveled at an inclined angle and secured in that position by butterfly nuts P, made of material such as metal. The operation of the butterfly nuts P allows for a prefered angle setting of the blade pieces A relative to the ends of the operating parts L.

Referring to FIG. 3A and FIG. 3B, the nail clipper may also have a box Q attached around the blade pieces A, pivoting parts E, holding piece J, the ends of the operating parts L where they are attached to the pivoting parts, and the hinge mounting boards G. Box Q may be made of transparent plastic material such as a high molecular compound, and its function is for containing and preventing the dispersion of cut pieces of nail. The box Q can be formed with a rectangular-shaped or oval-shaped volume defined within its surface, which is sized to define a perimeter around the holding piece J and the pivoting parts E. The box Q is formed as an attached nail container open at its upper surface for receiving the pet's nail and also has a lower receptacle R and a pair of grooves S formed in its lower surface to allow the operating parts L to move its ends to open and retract. The box Q is split into two parts with each part having hook-shaped attachments to connect the two pieces in order to allow for easy detachment of the box Q from the whole unit.

As a specific example, the preferred nail clipper can have blade pieces A formed with a 9 mm diameter and 1 mm thickness. It can be made of metal and created by dividing a spherical or elliptical body with a straight line into two equal pieces and further dividing each piece with a straight line into two equal pieces with each of the quarter pieces having a hollow interior and formed with a cutting edge on one side of the blade piece rim. The hinge mounting board G may be made of metal and atached on the opposite side of the blade piece A rim. The board G may be formed with a hinge part C with 3.5 mm diameter and with 1.5 mm diameter pin holes D.

It is to be understood that many modifications and variations may be devised given the above description of the principles of the invention. It is intended that all such modifications and variations be considered as within the spirit and scope of this invention, as defined in the following claims.

What is claimed is:

1. A nail clipper for pets comprising a pair of cutting surfaces formed by curved blade pieces, wherein each curved blade piece is substantially identical to the other and is formed by a curved surface with a hollow interior and a curved cutting edge, and means for pivotably mounting the curved blade pieces to face and abut with each other along their cutting edges to cut the pet's nails with a convex finish, wherein said means for pivotably mounting the curved blade pieces is constituted by the blade pieces being hinged by respective hinge parts to respective opposite ends of a holding piece and adapted to be pivotably moved by pivoting parts pivotally coupled to respective operating parts of the scissors structure said holding piece having a length extending substantially perpendicular to a plane of the cutting edges when the blades pieces abut one another, and further comprising a collecting box having a volume defined by a surface forming a perimeter around the blade pieces, hinge parts, holding piece, and pivoting parts where they are coupled to the operating parts of the scissors structure.

2. A nail clipper for pets according to claim 1, wherein said curved blade pieces are created by dividing a elliptical body with a straight line into two equal pieces, and further dividing each semi-elliptical piece with a straight line into equal quarter-elliptical pieces, and wherein each quarter-elliptical piece is formed with a hollow interior and a curved cutting edge.

3. A nail clipper for pets according to claim 1, wherein each said blade piece is attached to a hinge mounting board on an opposite side from its blade cutting edge, and wherein each said hinge mounting board has the hinge part for the respective blade piece provided along one side edge of the hinge mounting board for coupling each blade piece to a respective one of opposite ends of the holding piece.

4. A nail clipper for pets according to claim 3, wherein each said respective hinge part is cylinder-shaped and provided with a pin hole for insertion of a pin through a hole on the respective end of the holding piece and into each hinge pin hole to connect each blade piece to the holding piece.

5. A nail clipper for pets according to claim 3, wherein said pivoting parts are attached to the respective hinge mounting boards for the respective blade pieces, in order to to open and retract the blade pieces about the hinge parts as their axes of rotation.

6. A nail clipper for pets according to claim 5, wherein the ends of said pivoting parts are coupled to ends of two operating parts of the scissors structure, and the two operating parts are coupled across one another at a pivot center and secured by a rotation pin together, and the other ends of the operating parts have scissors handles or grips.

7. A nail clipper for pets according to claim 1, wherein said operating parts have angle adjustment mechanisms at their operating ends to allow for preferential angle setting of the blade pieces relative to the operating parts.

8. A nail clipper for pets according to claim 1, wherein said collecting box is split into two parts with each part having attachments to connect the two parts in order to allow for easy detachment of the box from the whole unit.

9. A nail clipper for pets according to claim 1, wherein said curved blade pieces are created by dividing a spherical body with a straight line into two equal pieces, and further dividing each semi-spherical piece with a straight line into equal quarter-spherical pieces, and wherein each quarter-spherical piece is formed with a hollow interior and a curved cutting edge.

* * * * *